United States Patent
Yoon et al.

(10) Patent No.: US 6,909,485 B2
(45) Date of Patent: Jun. 21, 2005

(54) REFLECTIVE LIQUID CRYSTAL DISPLAY DEVICE HAVING CHOLESTERIC LIQUID CRYSTAL COLOR FILTER AND METHOD OF MANUFACTURING THE SAME

(75) Inventors: Sunghoe Yoon, Annyang-si (KR); Hee-Nam Hwang, Gunpo-si (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/637,559

(22) Filed: Aug. 11, 2003

(65) Prior Publication Data
US 2004/0032556 A1 Feb. 19, 2004

(30) Foreign Application Priority Data
Aug. 14, 2002 (KR) .................. 10-2002-0048100

(51) Int. Cl.[7] ............................................. G02F 1/1337
(52) U.S. Cl. ........................................ 349/123; 349/106
(58) Field of Search ................................ 349/123, 106, 349/108, 194, 176, 115, 96–98

(56) References Cited

U.S. PATENT DOCUMENTS 6,778,238 B2 * 8/2004 Moon et al. ................ 349/106

* cited by examiner

Primary Examiner—Kenneth Parker
Assistant Examiner—Phu Vu
(74) Attorney, Agent, or Firm—McKenna Long & Aldridge LLP

(57) ABSTRACT

A reflective liquid crystal display device of the present invention includes: first and second substrates spaced apart from each other, the first and second substrates having sub-pixels; a liquid crystal layer interposed between the first and second substrates; a switching element and a pixel electrode on a rear surface of the second substrate, wherein the switching element and the pixel electrode are formed within a sub-pixel and electrically connected to each other; a retardation film and a polarizer formed in series on a front surface of the second substrate; a double-layered CCF on a front surface of the first substrate, the double-layered CCF including red, green and blue CLC color films in the sub-pixels that respectively reflect wavelengths of red, green and blue colored light so that the sub-pixels produce red, green and blue colors, respectively; and a common electrode on the double-layered CCF layer; wherein the double-layered CCF layer includes a first and second CLC layers, a first alignment layer between the first CLC layer and the first substrate, and a second alignment layer between the first and second CLC layers; wherein a surface of the first CLC layer on which the second alignment layer is formed is surface-reformed; and wherein the first CLC layer reflects first wavelength bands of the light and the second CLC layer reflects second wavelength bands of the light.

37 Claims, 6 Drawing Sheets

REFLECTIVE LIQUID CRYSTAL DISPLAY DEVICE HAVING CHOLESTERIC LIQUID CRYSTAL COLOR FILTER AND METHOD OF MANUFACTURING THE SAME

This application claims the benefit of Korean Patent Application No. 2002-0048100, filed on Aug. 14, 2002, which is hereby incorporated by reference for all purposes as if fully set forth herein.

BACKGROUND OF THE INVENTION

1. Field of the Invention

The present invention relates to a liquid crystal display device, and more particularly to a reflective liquid crystal display device using a cholesteric liquid crystal color filter layer.

2. Discussion of the Related Art

A liquid crystal display device is thin, portable, low weight and low power consumption. The liquid crystal display device is a technology-intensive and value-added product and the liquid crystal display device is the next generation display device.

Among the various types of liquid crystal display devices commonly used, active matrix liquid crystal display (AM-LCD) devices, in which thin film transistors (TFTs) and pixel electrodes connected to the TFTs are disposed in matrix, have been developed because of their high resolution and superior display of moving images.

In general, the process of forming the liquid crystal display device includes forming switching devices and pixel electrodes on an array substrate, forming a color filter substrate with a color filter layer and a common electrode, and a liquid crystal cell process where a liquid crystal is interposed between the array substrate and the color filter substrate. Further, because the liquid crystal display device is a light-receiving type display device, a backlight device is required to supply light and display images. However, only about 7% of the light generated from the backlight device can pass through the liquid crystal cell. For this reason, the backlight device requires a high, initial brightness, and thus electric power consumption by the backlight device increases. A relatively heavy battery is needed to supply a sufficient power to the backlight of such a device.

To solve these problems, a reflective liquid crystal display device has been researched and developed. Because the reflective liquid crystal display device operates using ambient light other than an internal light source such as a backlight device, battery life can be increased resulting in longer use times. Namely, only the drive circuitry that drives the liquid crystal uses the battery power in the reflective liquid crystal display device.

For the reflective liquid crystal display device, a reflector and/or and a reflective electrode is arranged in a pixel region where the transparent electrode is formed in a transmissive liquid crystal display device. In other words, the reflective liquid crystal display device is driven using the light reflected from the reflective electrode or/and the reflector. However, the reflective liquid crystal display device is low in brightness due to the fact that the reflective liquid crystal display device uses the ambient light and the brightness depends on this ambient light from surroundings. One of the reasons for the low brightness is that the ambient light passes through the color filter twice. Due to the reflection on the reflector, the incident light from the outside passes the color filter and then is reflected from the reflector. Then, it is directed toward the color filter again. Therefore, most of the light is absorbed by the color filter, thereby decreasing the brightness.

In order to overcome above-mentioned problem, it is essential to raise the transmittance of the color filter. Further, to get the excellent transmittance, the color filter ought to have low color purity. However, there is a limitation of lowering the color purity.

Accordingly, to improve the operating characteristics (such as brightness) of the reflective liquid crystal display device, a cholesteric liquid crystal (CLC) has been studied and developed, which selectively transmits or reflects the light with a specific color. If the CLC color filter is used in the reflective LCD device, it is possible to omit the reflector from the reflective LCD device, thereby simplifying the manufacturing processes. Furthermore, it has the advantage of increased color purity and contrast ratio.

The CLC has a helical shape and the pitch of the CLC is controllable. Therefore, the CLC color filter can selectively transmit or/and reflect the light. In other words, as is well known, all objects have their intrinsic wavelength, and the color that an observer recognizes is the wavelength of the light reflected from or transmitted through the object. The wavelength ($\lambda$) of the reflected light can be represented by a following functional formula of pitch and average refractive index of CLC; $\lambda = n(avg) \cdot pitch$ where $n(avg)$ is the average index of refraction. For example, when the average refractive index of CLC is 1.5 and the pitch is 430 nm, the wavelength of the reflected light is 650 nm and the reflective light becomes red. In this manner, the green color and the blue color also can be obtained by adjusting the pitch of the CLC.

In other words, the wavelength range of visible light is about 400 nm to 700 nm. The visible light region can be broadly divided into red, green, and blue regions. The wavelength of the red visible light region is about 660 nm, that of green is about 530 nm, and that of blue is about 470 nm. Due to the pitch of the cholesteric liquid crystal, the CLC color filter can selectively transmit or reflect the light having the intrinsic wavelength of the color corresponding to each pixel thereby clearly displaying the colors of red (R), green (G) and blue (B) with a high purity. In order to implement a precise color, a plurality of the CLC color filters can be arranged, therefore the CLC color filter can display the full color more clearly than the color filter conventionally used. The cholesteric liquid crystal (CLC) color filter will be referred to as CCF herein after.

FIG. 1 is a schematic cross-sectional view illustrating a display area of a reflective liquid crystal display (LCD) device having a CCF (cholesteric liquid crystal color filter) layer according to a related art.

As shown, a reflective LCD device includes lower and upper substrates 10 and 30 and an interposed liquid crystal layer 50 therebetween. The lower and upper substrates 10 and 30 include transparent substrates 1, respectively, such as glass.

On the surface facing the upper substrate 30, the lower substrate 10 includes a light-absorbing layer 12. An alignment layer 14 is disposed on the light-absorbing layer 12. A CCF (cholesteric liquid crystal color filter) layer 16 including red (R), green (G) and blue (B) CLC color films 16a, 16b and 16c in sub-pixels are disposed on the alignment layer 14. A common electrode 18 is disposed on the entire CCF layer 16. The light-absorbing layer 12 selectively absorbs some portions of light incident from the CCF layer 16, and the alignment layer 14 aligns and orients the cholesteric liquid crystals formed thereon.

Still referring to FIG. 1, on the surface facing the lower substrate 10, the upper substrate 30 includes a switching device, such as a thin film transistor T, and a pixel electrode 32 in each sub-pixel. The pixel electrodes 32 apply voltage to the liquid crystal layer 50 with the common electrode 18. On the other surface, the upper substrate 30 includes a retardation layer 34 and a polarizer 36 in series. The retardation layer 34 is a quarter wave plate (QWP) that has a phase difference of λ/4 (lambda/4), and the polarizer 36 is a linearly polarizing plate that only transmits portions of light parallel with its polarizing axis.

In the reflective LCD device shown in FIG. 1, the CCF layer 16 produces colors and also acts as a reflector reflecting light. Therefore, the brightness of the reflective LCD device of FIG. 1 fully depends on the reflecting characteristic of CCF layer 16.

FIG. 2 is a graph illustrating spectrums of light reflected by red, green and blue CLC color films of FIG. 1.

In FIG. 2, the CCF type reflective LCD device has peak wavelengths Ia, Ib and Ic corresponding to the red, green and blue CLC color films, and the peak points Ia, Ib and Ic are 650 nm, 550 nm and 450 nm, respectively. The cholesteric liquid crystal material of the CLC color films has a birefringence of about 0.15, and thus the maximum width of each wavelength, especially the green wavelength, is 50 nm as shown in FIG. 1. This means that the reflectance of the reflective LCD device decreases.

As compared with the CCF type reflective LCD device, a light-absorbing type reflective or transmissive LCD device has a color filter that only transmits the portion of light matching with the color filter wavelength and absorbs the other portions of light. Therefore, the thickness of the light-absorbing type color filer is in inverse proportion to the reflectance and in proportion to the color purity. That is, the brightness and contrast ratio of the light-absorbing type reflective/transmissive LCD device is adjustable by way of controlling the thickness of the light-absorbing type color filter layer. However, because the CCF layer has its own pitch and that pitch is determined when the LCD device is designed, it is very difficult for the CCF type reflective LCD device to adjust and control the color purity and reflectance in the same way as the light-absorbing type reflective/transmissve LCD device does.

The red, blue and green colors of the CCF layer are controlled and achieved by the pitch and birefringence of the cholesteric liquid crystal of each sub-pixel. As the birefringence becomes larger, the reflected wavelength band also becomes wider. By adjusting the reflectance in the reflected wavelength band, the desired color purity and brightness can be achieved. However, it is very difficult to create and develop the cholesteric liquid crystal material that has a large birefringence because the manufacturing cost increases as the birefringence increases.

SUMMARY OF THE INVENTION

Accordingly, the present invention is directed to a CCF (cholesteric liquid crystal color filter) type reflective liquid crystal display device that substantially obviates one or more of the problems due to limitations and disadvantages of the related art.

An advantage of the present invention is to provide a CCF type reflective liquid crystal display device that has a high brightness and an improved color display.

Another advantage of the present invention is to provide a CCF type reflective liquid crystal display device having a wider reflected wavelength band in each cholesteric liquid crystal color filter.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a reflective liquid crystal display device includes: first and second substrates spaced apart from each other, the first and second substrates having sub-pixels; a liquid crystal layer interposed between the first and second substrates; a switching element and a pixel electrode on a rear surface of the second substrate, wherein the switching element and the pixel electrode are formed within a sub-pixel and electrically connected to each other; a retardation film and a polarizer formed in series on a front surface of the second substrate; a double-layered CCF on a front surface of the first substrate, the double-layered CCF including red, green and blue CLC color films in the sub-pixels that respectively reflect wavelengths of red, green and blue colored light so that the sub-pixels produce red, green and blue colors, respectively; and a common electrode on the double-layered CCF layer; wherein the double-layered CCF layer includes a first and second CLC layers, a first alignment layer between the first CLC layer and the first substrate, and a second alignment layer between the first and second CLC layers; wherein a surface of the first CLC layer on which the second alignment layer is formed is surface-reformed; and wherein the first CLC layer reflects first wavelength bands of the light and the second CLC layer reflects second wavelength bands of the light.

In another aspect, the present invention provides a method of forming a double-layered CCF layer for use in a reflective liquid crystal display device. The method includes: forming a first alignment layer over a substrate where sub-pixels are defined; forming a first CLC layer on the first alignment layer, the first CLC layer including first red, green and blue CLC color films that reflect first wavelength bands of light; surface-reforming a surface of the first CLC layer; forming a second alignment layer on the first CLC layer after surface-reforming; and forming a second CLC layer on the second alignment layer, the second CLC layer including second red, green and blue CLC color films that reflect second wavelength bands of light; wherein the second red CLC color film is disposed corresponding to the first red CLC color film in the same sub-pixel; wherein the second green CLC color film is disposed corresponding to the first green CLC color film in the same sub-pixel; and wherein the second blue CLC color film is disposed corresponding to the first blue CLC color film in the same sub-pixel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

Figure 1:
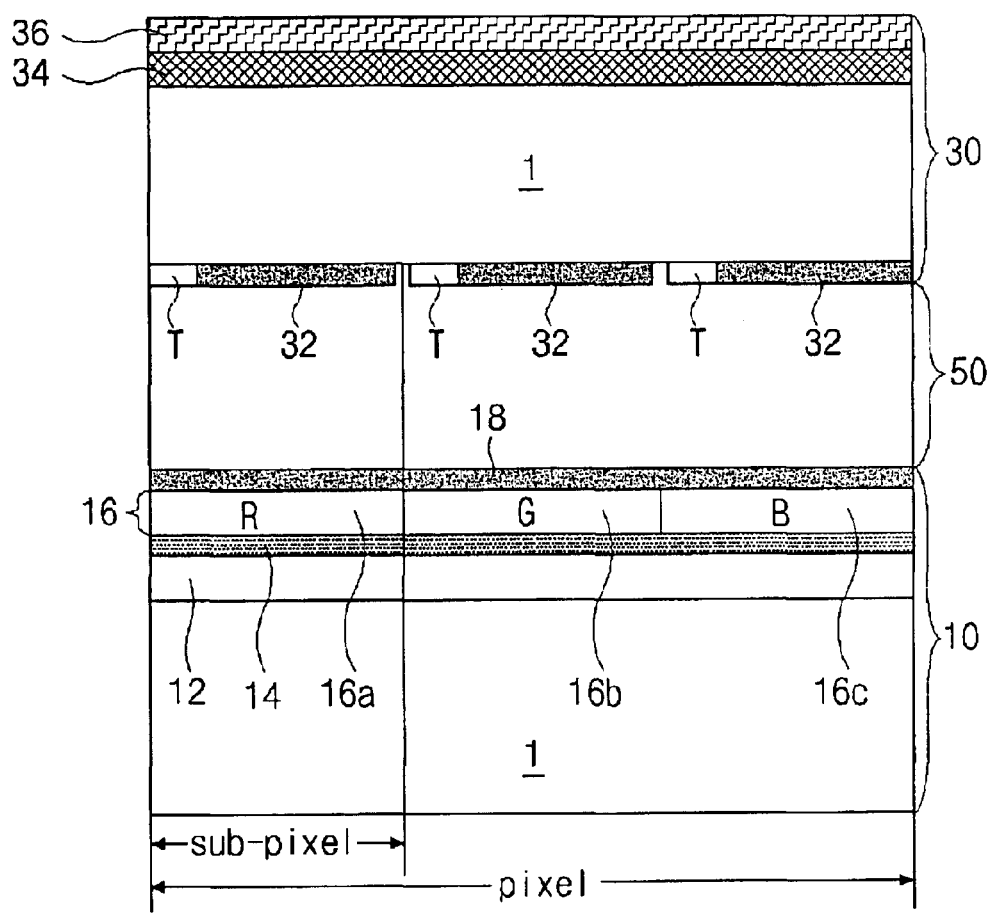
FIG. 1 is a schematic cross-sectional view illustrating a display area of a reflective liquid crystal display (LCD)
Figure 2:
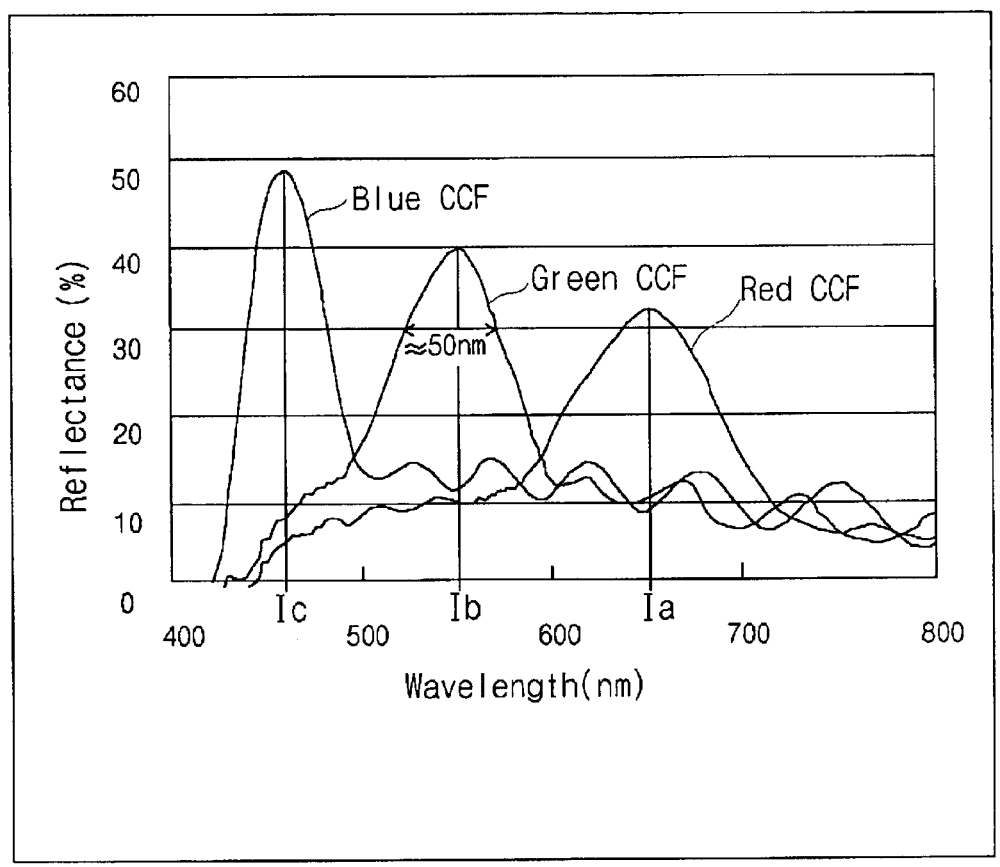
Figure 3:
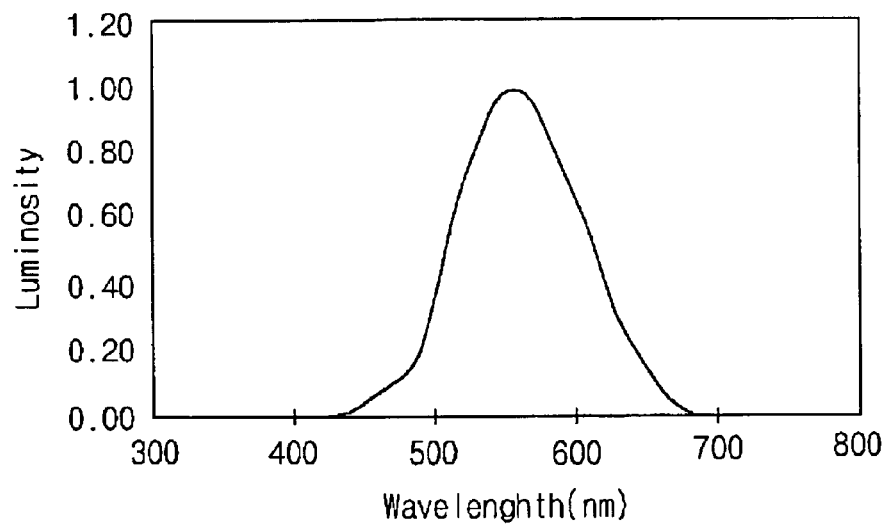
Figure 4:
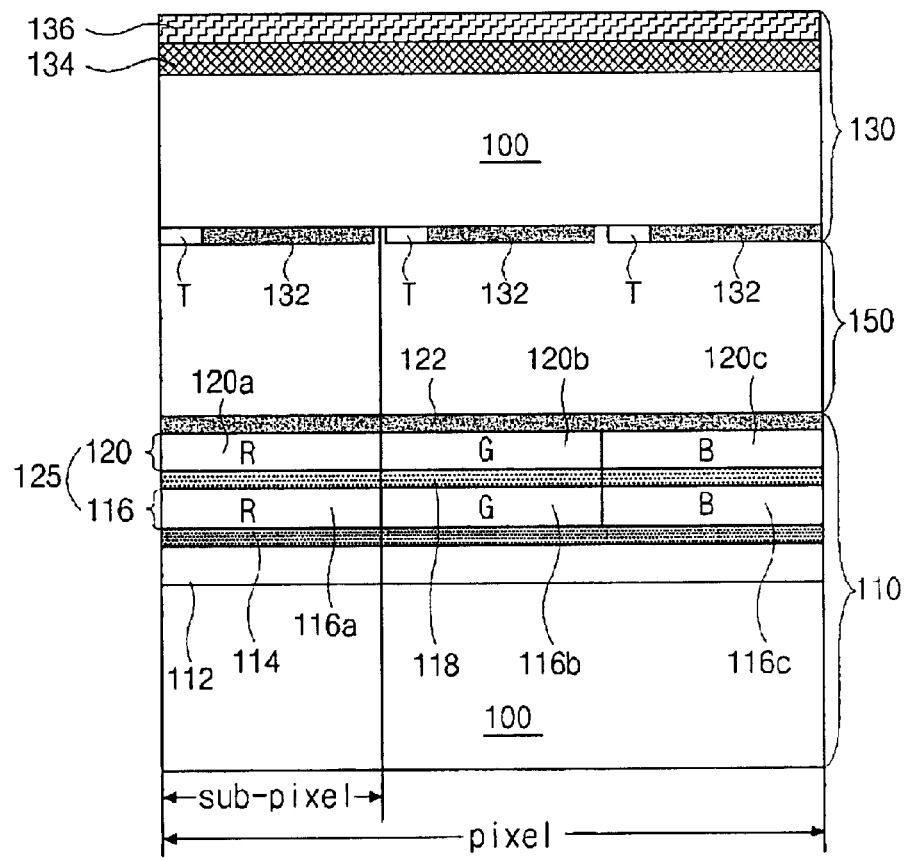
Figure 5:
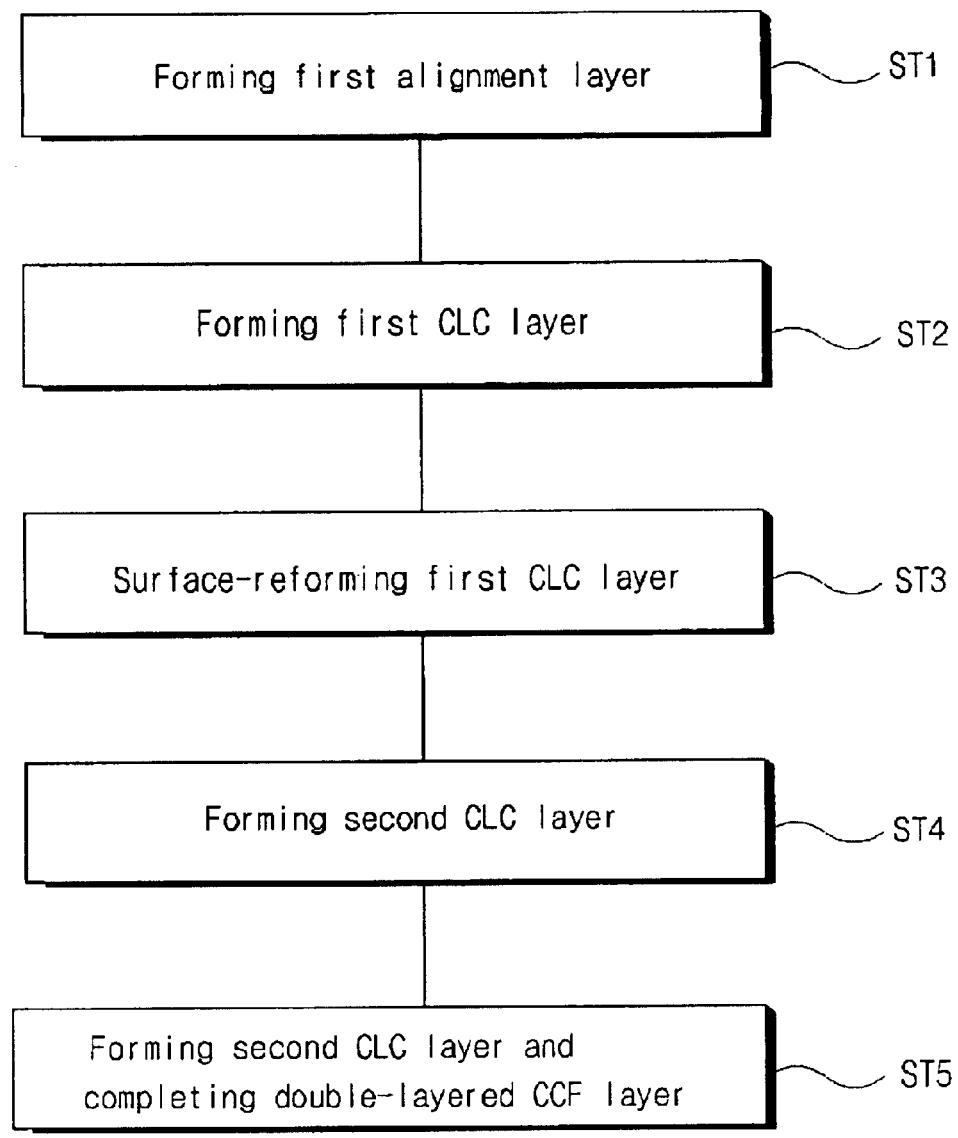
Figure 6:
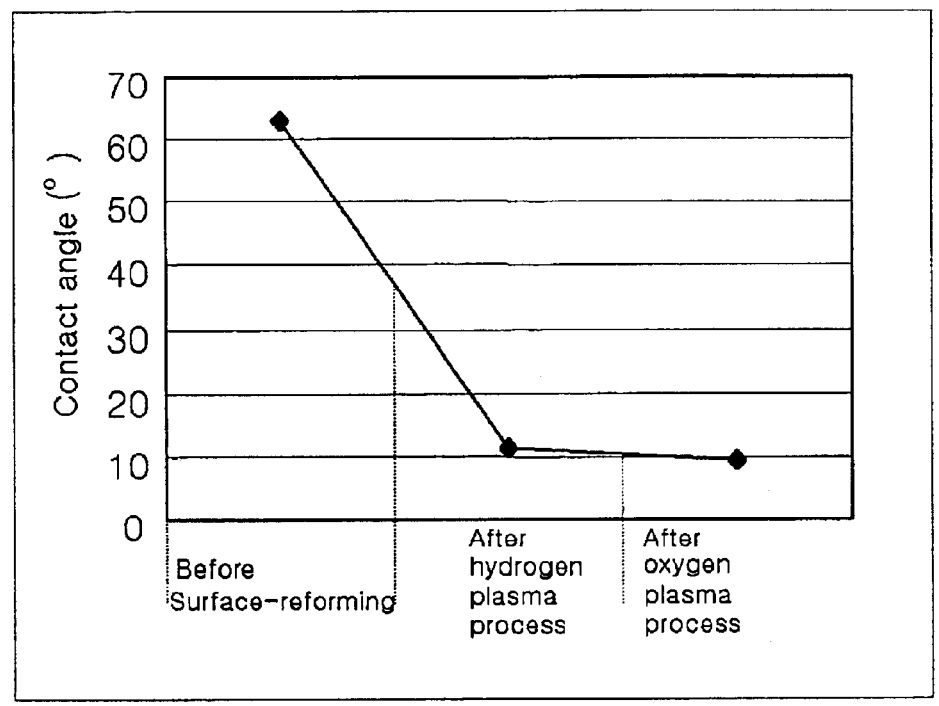
Figure 7A:
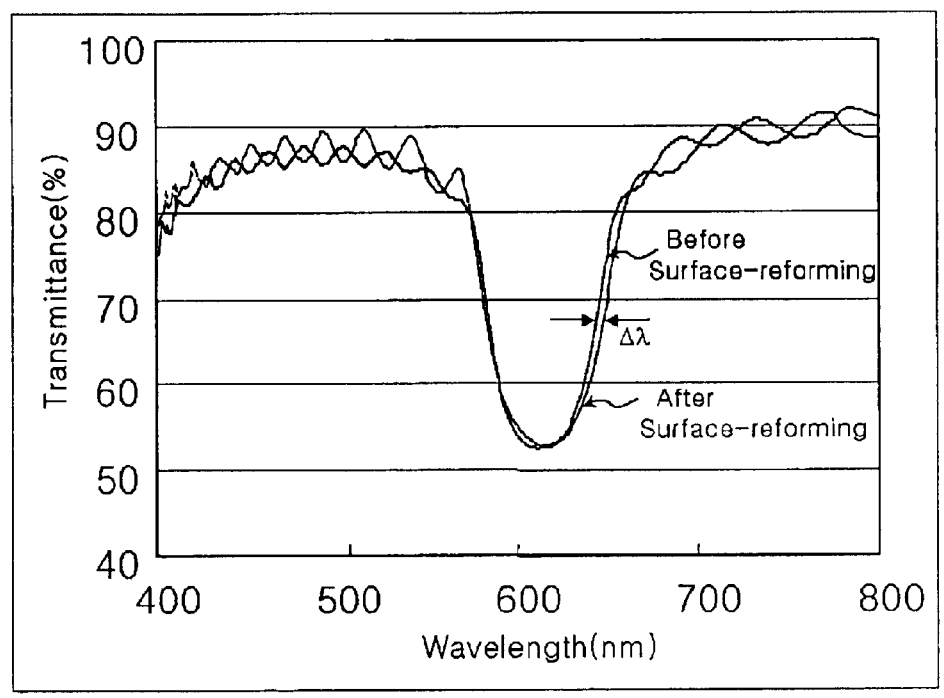
Figure 7B:
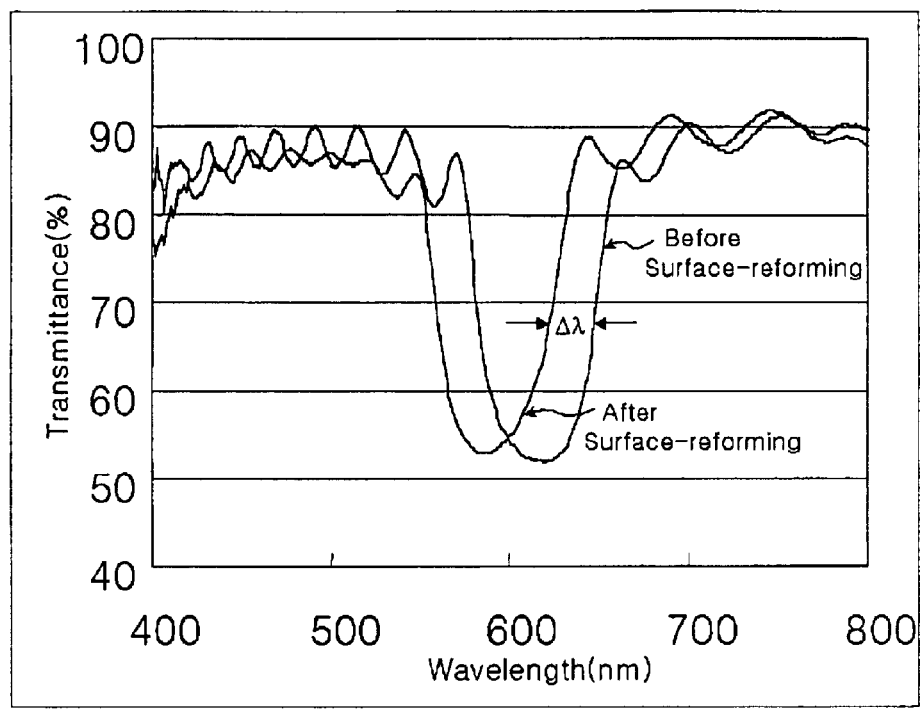
Figure 8:
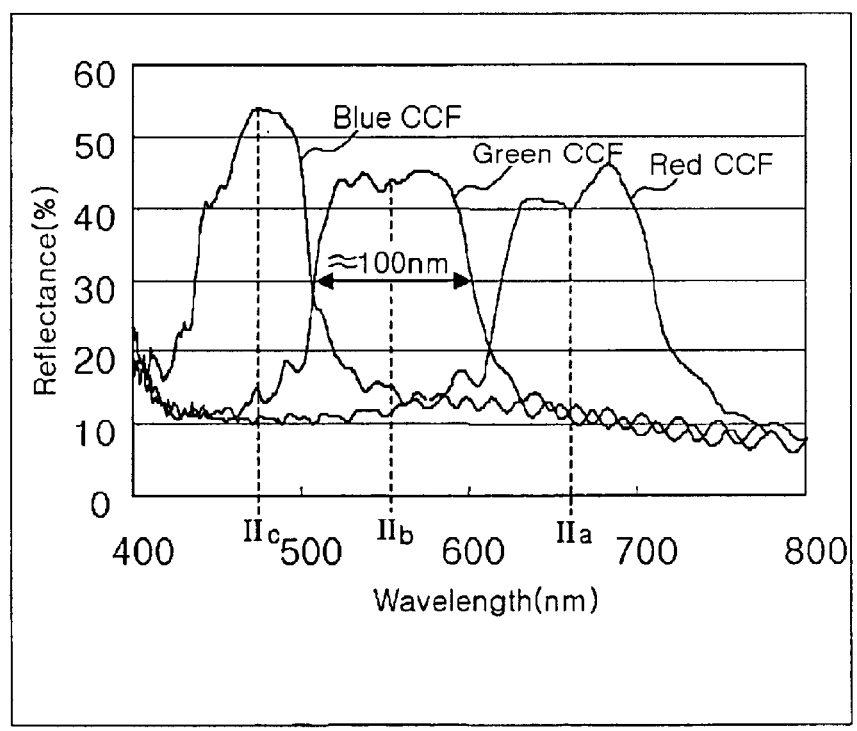

device having a CCF (cholesteric liquid crystal color filter) layer according to a related art;

FIG. 2 is a graph illustrating spectrums of light reflected by red, green and blue CCFs of FIG. 1;

FIG. 3 is a graph illustrating a luminosity curve of the human eye;

FIG. 4 is a schematic cross-sectional view illustrating a reflective liquid crystal display (LCD) device having a CCF (cholesteric liquid crystal color filter) layer according to the present invention;

FIG. 5 is a flow chart illustrating process steps of forming the reflective LCD device of FIG. 4;

FIG. 6 is a graph illustrating contact angles between the surface-reformed CLC layer and a solution for the overlying alignment layer;

FIG. 7A is a graph illustrating transmittance of the CCF layer before and after the surface reforming using hydrogen plasma;

FIG. 7B is a graph illustrating transmittance of the CCF layer before and after the surface reforming using oxygen plasma; and FIG. 8 is a graph illustrating reflective spectrums of the double-layered CCF layer that is formed according to the present invention and has the red, green and blue CLC color films.

DETAILED DESCRIPTION OF THE ILLUSTRATED EMBODIMENTS

Reference will now be made in detail to embodiment of the present invention, example of which is illustrated in the accompanying drawings.

FIG. 3 is a graph illustrating a luminosity curve of the human eye. In the graph shown in FIG. 3, it is thoroughly recognized that the human eye can see the wavelength band of light ranging from 400 nm to 700 nm. Particularly, it is fully understood in the graph of FIG. 3 that the luminosity of human eyes has the highest value in the range of 500 nm to 600 nm. Therefore in the present invention, the wavelength of color is extended within the wavelength band of light that is closest to the highest value of the luminosity; 500–600 nm.

FIG. 4 is a schematic cross-sectional view illustrating a reflective liquid crystal display (LCD) device having a CCF (cholesteric liquid crystal color filter) layer according to the present invention.

As shown, a reflective LCD device of the present invention includes first and second substrates 110 and 130 and an interposed liquid crystal layer 150 therebetween. The first and second substrates 110 and 130 include transparent substrates 100, respectively, such as glass.

On the rear surface of the transparent substrate 100 facing the first substrate 110, the second substrate 130 includes a switching device, such as a thin film transistor T, and a pixel electrode 132 in each sub-pixel. Although not shown in FIG. 4, each thin film transistor T includes a gate electrode, a source electrode and a drain electrode. The second substrate 130 further includes gate lines that apply gate signal voltages to the gate electrodes and data lines that apply data signal voltage to the source electrodes. Also, the drain electrode of the thin film transistor T electrically communicates with the pixel electrode 132.

On the other surface of the transparent substrate 100, the second substrate 130 includes a retardation layer 134 and a polarizer 136 in series. The retardation layer 134 may be a quarter wave plate (QWP) that has a phase difference of $\lambda/4$ (lambda/4), and the polarizer 136 may a linearly polarizing plate that only transmits portions of light parallel with its polarizing axis.

On the front surface of the transparent substrate 100 facing the second substrate 130, the first substrate 110 includes a light-absorbing layer 112 and a double-layered CCF (cholesteric liquid crystal color filter) layer 125 in series. The double-layered CCF layer 125 includes a first CLC (cholesteric liquid crystal) layer 116 and a second CLC layer 120. The first substrate 110 of the present invention further includes a first alignment layer 114 between the light-absorbing layer 112 and the first CLC layer 116 and a second alignment layer 118 between the first and second CLC layers 116 and 120.

The first CLC layer 116 includes first red (R), green (G) and blue (B) CLC color films 116a, 116b and 116c each corresponding to a sub-pixel. All of three first R, G and B CLC color films 116a, 116b and 116c correspond to one pixel. The second CLC layer 120 also includes second red (R), green (G) and blue (B) CLC color films 120a, 120b and 120c each corresponding to a sub-pixel. The second R CLC color film 120a corresponds to the first R CLC color film 116a, the second G CLC color film 120b to the first G CLC color film 116b, and the second B CLC color film 120c to the first B CLC color film 116c. Thus, the same CLC color films are disposed in the same sub-pixel. Additionally, the first substrate 110 further includes a transparent common electrode 122 on the double-layered CCF layer 125.

In the present invention, the light-absorbing layer 112 may be omitted depending on the material for the CCF layer 125 and on the characteristics of the reflective LCD device. Although not shown in FIG. 4, liquid crystal alignment layers that contact the liquid crystal layer 150 to align it may be disposed on inner surfaces of the first and second substrates 110 and 130.

In the present invention, the first and second CLC layers 116 and 120 have a different wavelength band although they produce the same color. So in the present invention the first and second CLC layers 116 and 120 enlarge the wavelength band of each color by almost double. For example, as the green color has the peak wavelength of 550 nm, the first green CLC color film 116b may be designed to have a wavelength band of 500–550 nm and then the second green CLC color film 120b may be designed to have a wavelength band of 550–600 nm, whereby the total wavelength band of the green color is in the range of 500–600 nm so that the band width may be 100 nm. Compared to the related art reflective LCD device having the wavelength band width of 50 nm, the reflective LCD device of the present invention may have much wider wavelength band width.

Furthermore, the upper surface of the first CLC layer 116 is surface-treated, for example using, surface reforming, in order to improve the adhesive characteristics of the first CLC layer 116. The surface reforming of the first CLC layer 116 may be conducted using plasma. Hydrogen ($H_2$) gas is applied as a reaction gas before and after the surface reforming for the purpose of improving the contact characteristics and the transmissivity of the cholesteric liquid crystal material.

In the present invention, the reflective LCD device has the double-layered CCF layer and the alignment layer between the first and second CLC layers. A method of forming the double-layered CCF layer 125 of FIG. 4 will be explained with reference to FIG. 5.

FIG. 5 is a flow chart illustrating process steps of forming the double-layered CCF layer of FIG. 4.

In initial step ST1, the first alignment layer 114 of FIG. 4 is formed. During this formation process, an aqueous alignment material is coated on the transparent substrate with a thickness of 500–2000 angstroms (Å) and then the aqueous alignment material is cured to become the first alignment layer. Furthermore, the first alignment layer formed on the transparent substrate is, for example, rubbed in a desired direction in order to make an alignment direction on its surface. When rubbing the first alignment layer, a roller having a peculiar fabric is applied to the surface of the alignment layer and then the roller spins round and moves in the desired direction. At this time, the rubbing direction makes a pretilt angle of less than 10 degrees with the cholesteric liquid crystal molecules. The material for the first alignment layer may be selected from a group consisting of polyimide and polyamic acid material, for example.

In step ST2, the first CLC layer 116 of FIG. 4 is formed on the first alignment layer. In this step, nematic liquid crystal and chiral dopants are mixed at the ratio of from one to one to ten to one (i.e., from 1:1 to 10:1). The nematic liquid crystal is a monomer material or a polymer material. The mixture of the nematic liquid crystal and the chiral dopants is applied on the first alignment layer and then determined to have the reflected wavelength of 200–400 nm, thereby forming the first CLC layer.

Before applying the mixture on the first alignment layer, the mixture is dissolved in a solvent agent to be a 35–55% solution. Then, the solution may be strained through a less than 0.2 mm filter to remove particles that may be included therein. The solvent agent dissolving the mixture may be selected from a group including Toluene, Xylene and NMP (N-methyl-2-pyrrolidone). When applying the solution on the first alignment layer, a spin coating method is used. Further, the solution is formed on the first alignment layer with a thickness of 2–5 mm. If the mixture includes the monomer material, the solution includes a 0.2–5.0% photo initiator. Beneficially, it is recommended that the solution include the 1.0–2.0% photo initiator.

The first CLC layer formed through the step ST2 absorbs UV (ultraviolet) light of 365 nm wavelength. As widely known, the CLC layer has its own pitch that is defined by a helical period of CLC helix structure. The wavelength of the reflected light is defined by the pitch of the CLC layer. Therefore, when setting the pitch, the quantity of UV light is controlled and the exposure quantity of UV light to the CLC layer is adjusted to define the helical pitch of the CLC layer. For example, UV light with a wavelength of 300–400 nm may irradiate the CLC layer with an energy of 100–700 mJ, and thus the first CLC layer 116 of FIG. 4 may have the first red, green and blue color films depending on the exposure energy. Particularly, the UV light has a wavelength of 365 nm. The CLC layer of the present invention changes its helical pitch in accordance with the quantity of UV light absorbed with the wavelength of 300–400 nm, particularly 365 nm, whereby the changed helical pitch determines the reflected wavelength of the light.

After forming the first CLC layer including the first red, green and blue CLC color films, the first CLC layer may be cured by an irradiation of UV light having a wavelength of 400–450 nm in an amount of 200–30,000 mJ. More particularly, the UV light for curing may have the wavelength of 405 nm and the energy of 600–18,000 mJ. In this case, the photo initiator is recommended to be sensitive to the UV light having the wavelengths of 400–450 nm. Namely, the photo initiator type and concentration are controlled and adjusted to be suitable for the UV light of 400–450 nm wavelengths. Further, for preventing the change of helical pitch of the CLC layer which is caused by the UV light of 300–400 nm wavelengths, a filter that blocks the UV light of less than 400 nm is used, thereby easily achieving the effective photo curing. Additionally, to improve the hardness of the CLC layer, nitrogen ($N_2$) and argon (Ar) gases may be removed during the curing process.

In step ST3, a surface reforming is performed on the surface of the first CLC layer 116 of FIG. 4. The surface reforming increases the adhesion between the CLC layer and a later-formed second alignment layer 118. For the surface reforming, a surface roughness of the first CLC layer may be increased by way of a physical rubbing process. Alternatively, the surface of the first CLC layer may be polarized by way of applying an alkali solution having a desired concentration. Furthermore, a plasma process method or an ion-beam process method may be applied to the surface of first CLC layer as the surface reforming.

Such a plasma process or ion-beam process method scarcely damages the surface of the first CLC layer. The plasma process method and the ion-beam process method also minimize the dispersion of light that may increase in proportion to the increase in surface-roughness. Furthermore, the plasma process or ion-beam process method may be the better way to control the coating and adhesive characteristics of the CLC layer. The plasma process method uses oxygen, argon, and hydrogen gases as a reaction gas for the plasma. In the plasma process method, the plasma gases having high energy density strike the surface of the first CLC layer in accordance with the applied electric field and then react with the molecules of the CLC surface, thereby reforming the surface characteristics of the first CLC layer.

The ion-beam process method is similar to the plasma process method, but additionally has a sub-process of filtering particles having the same energy level after forming the plasma. At this time, the reformed surface of the first CLC layer may change its energy level, that is, the surface tension of the first CLC layer changes, and then the reformed surface may have the improved attraction to the overlying alignment layer. Therefore, the coating and adhesive characteristics are improved. The barometer of attraction may be represented by a contact angle between the first CLC layer and the coating solution for overlying alignment layer. The surface reforming decreases the contact angle between the first CLC layer and the overlying second alignment layer. As the contact angle becomes minimized, the coating wettability increases, thereby enlarging the contact attraction between the first CLC layer and the overlying alignment material.

FIG. 6 is a graph illustrating contact angles between the surface-reformed CLC layer and an aqueous material for the overlying alignment layer. As shown in FIG. 6, the surface of the first CLC layer has a contact angle of more than 45 degrees with the aqueous alignment material before the surface reforming. However, it is shown that the contact angle has the value of less than 15 degrees after the hydrogen plasma process and after the oxygen plasma process. The degree of the surface reforming is variable depending on what kind of reaction gas is used. Further, the degree of the surface reforming depends on the plasma chamber condition and the process time. Among the various factors for the surface reforming, it may be important to find the best condition for the superior coating and adhesive properties.

The following table 1 shows the measured data that illustrate the plasma process conditions of reaction gases for the surface reforming of a CLC layer, and also illustrate the variation of reflected light wavelength.

TABLE 1

| Reaction gases | Hydrogent (H$_2$) | | | | Oxygen (O$_2$) | | | |
|---|---|---|---|---|---|---|---|---|
| Conditions Units | Power Watt | Pressure mTorr | Time Sec. | Δλ Nm | Pressure Watt | Pressure mTorr | Time Sec. | Δλ nm |
| | 800 | 100 | 60 | 0 | 800 | 100 | 60 | −18 |
| | 800 | 100 | 120 | −2 | 800 | 100 | 120 | −18 |
| | 800 | 100 | 180 | −4 | 800 | 100 | 180 | −18 |
| | 800 | 100 | 300 | −7 | 800 | 100 | 300 | −24 |
| | 500 | 100 | 60 | 0 | 500 | 100 | 60 | −18 |
| | 300 | 100 | 60 | 0 | 300 | 100 | 60 | −18 |

FIG. 7A is a graph illustrating transmittance of the CCF layer before and after the surface reforming using hydrogen plasma, and FIG. 7B is a graph illustrating transmittance of the CCF layer before and after the surface reforming using oxygen plasma. As shown in Table 1 and FIGS. 7A and 7B, when performing the plasma surface reforming using the hydrogen and oxygen gases using the same power, same pressure and same time, the hydrogen plasma hardly changes the wavelength variation (Δλ) of the CCF layer between before and after the surface reforming, but the oxygen plasma markedly changes the wavelength variation (Δλ) of the CCF layer between before and after the surface reforming. That is to say, the hydrogen plasma surface reforming is the best way, which improves the adhesion between the CLC layer and the alignment layer and which does not affect the transmittance of the CLC layer. The oxygen plasma surface reforming may damage the surface of the CLC layer, and thus the transmitting spectrums of the CLC layer changes between before and after the surface reforming, and the reflected wavelength of light that is desired and settled previously moves to anther point. Accordingly, because the reformation of the surface of the CLC layer varies depending on the reaction gas and the process conditions, it is advisable to carefully find what kind of material is used and how the surface of the material is reformed.

Now referring back to FIG. 5, ST4 is a step that produces the second alignment layer (see reference 118 of FIG. 4) on the reformed first CLC Layer. The step ST4 of forming the second alignment layer is similar to the step ST1 that forms the first alignment layer. During the formation process step ST4, an aqueous alignment material is coated on the first CLC layer and then the aqueous alignment material is cured to become the second alignment layer. Furthermore, the surface of the second alignment layer is, for example, rubbed in a desired direction in order to make an alignment direction thereon. In the present invention, because the first CLC layer is surface-reformed during the step ST3, the second alignment layer has a strong adhesive strength to the first CLC layer. Namely, the adhesion between the first CLC layer and the second alignment layer increases due to the previously performed surface reforming.

Now in step ST 5, the second CLC layer 120 of FIG. 4 is formed on the second alignment layer so that the CCF layer 125 is complete including the first and second CLC layers 116 and 120. At this time, the previous step ST2 forming the fist CLC layer can be applied to the step ST5 forming the second CLC layer. Namely, the step ST5 is very similar to the step ST2.

During the step ST5, it is very important that each of the CLC color films of the second CLC layer corresponds to the same colored CLC color films of the first CLC layer, as shown in FIG. 4. The step ST5 includes a curing process in order to further strengthen the double-layered CCF layer. For example, the substrate having the above-mentioned double-layered CCF layer is cured in the oven at a temperature of 150–250 degrees Celsius for about 1–2 hours.

FIG. 8 is a graph illustrating reflectance of the double-layered CCF layer that is formed according to the present invention and has the red, green and blue CLC color films.

As shown, the red, green and blue CLC color films have peak wavelengths IIa, IIb and IIc of 660 nm, 550 nm and 450 nm, respectively. The wavelength band width of each of red, green and blue CLC color films is about 100 nm, as shown in FIG. 8.

Because each CLC color film has a wavelength band width almost double that of the conventional CLC of FIG. 1, the brightness will be improved. In the present invention, the first CLC layer forms first reflective wavelength bands around the peak wavelength bands and the second CLC layer forms second reflective wavelength bands around the peak wavelength bands IIa, IIb and IIc. The sum of the first and second reflective wavelength bands represents the total wavelength bands width in the reflective liquid crystal display device of the present invention. The CCF layer having the piled-up structure of the first and second CLC layers may have an improved reflectance almost double that the conventional CLC.

According to the present invention, the reflective liquid crystal display device having the double-layered CCF layer provides a higher color purity compared to the conventional reflective liquid crystal display device having the light-absorptive color filters and improves the birefringence of the CLC layer compared to the conventional reflective liquid crystal display device having a single-layered CCF layer, thereby increasing the brightness and resolution thereof.

The reflective liquid crystal display device having the CCF layer and the method thereof have the following advantages. First, it is easy to control the ranges of the reflected wavelength of the CCF layer. Second, due to the surface reforming of the CLC layer, the overlaying alignment layer is easily formed on the CLC layer, thereby increasing the manufacturing yield.

It will be apparent to those skilled in the art that various modifications and variation can may be made in the present invention without departing from the spirit or scope of the invention. Thus, it is intended that the present invention cover the modifications and variations of this invention provided they come within the scope of the appended claims and their equivalents.

What is claimed is:

1. A reflective liquid crystal display device, comprising:
   first and second substrates spaced apart from each other, the first and second substrates having sub-pixels;

a liquid crystal layer interposed between the first and second substrates;

a switching element and a pixel electrode on a rear surface of the second substrate, wherein the switching element and the pixel electrode are formed within a sub-pixel and electrically connected to each other;

a retardation film and a polarizer formed in series on a front surface of the second substrate;

a double-layered CCF on a front surface of the first substrate, the double-layered CCF including double-layered red, green and blue CLC color films in the sub-pixels that respectively reflect wavelengths of red, green and blue colored light so that the sub-pixels produce red, green and blue colors, respectively; and a common electrode on the double-layered CCF layer;

wherein the double-layered CCF includes a first and second CLC layers, a first alignment layer between the first CLC layer and the first substrate, and a second alignment layer between the first and second CLC layers; and wherein a surface of the first CLC layer on which the second alignment layer is formed is surface-reformed.

2. The device according to claim 1, wherein the first CLC layer reflects first wavelength bands of the light and the second CLC layer reflects second wavelength bands of the light.

3. The device according to claim 2, wherein the first wavelength band has a wavelength difference of less than about 50 nm from the second wavelength bands.

4. The device according to claim 3, wherein one of the first wavelength bands ranges from about 500 to 550 nm, and wherein one of the second wavelength bands ranges from about 550 to 600 nm.

5. The device according to claim 3, wherein the first CLC layer includes first red, green and blue CLC color films in the sub-pixels that reflect the first wavelength bands, and wherein the second CLC layer includes second red, green and blue CLC color films in the sub-pixels which reflect the second wavelength bands.

6. The device according to claim 5, wherein the first and second red CLC color films correspond to the same sub-pixel, the first and second green CLC color films correspond to the same sub-pixel, and the first and second blue CLC color films correspond to the same sub-pixels.

7. The device according to claim 6, wherein the first and second red, green and blue CLC color films constitute a pixel.

8. The device according to claim 1, wherein each of the wavelengths of red, green and blue colored light reflected by the red, green and blue CLC color films has a wavelength band width of about 100 nm.

9. The device according to claim 1, wherein the first and second alignment layers have a thickness ranging from about 500 to 2000 angstroms.

10. The device according to claim 1, further comprising a light-absorbing layer between the first substrate and the first alignment layer.

11. The device according to claim 1, wherein the retardation film is a quarter wave plate.

12. The device according to claim 1, wherein a surface of the first CLC layer is surface-reformed using plasma.

13. The device according to claim 12, wherein the plasma used for the surface reforming of the first CLC layer is hydrogen plasma.

14. The device according to claim 12, wherein the plasma used for the surface reforming of the first CLC layer is oxygen plasma.

15. The device according to claim 1, wherein the surface of the first CLC layer is surface-reformed using an ion-beam process.

16. A method of forming a double-layered CCF layer for use in a reflective liquid crystal display device, comprising:

forming a first alignment layer over a substrate where sub-pixels are defined;

forming a first CLC layer on the first alignment layer, the first CLC layer including first red, green and blue CLC color films that reflect first wavelength bands of light;

surface-reforming a surface of the first CLC layer;

forming a second alignment layer on the first CLC layer after surface-reforming; and forming a second CLC layer on the second alignment layer, the second CLC layer including second red, green and blue CLC color films which reflect second wavelength bands of light;

wherein the second red CLC color film is disposed corresponding to the first red CLC color film in the same sub-pixel;

wherein the second green CLC color film is disposed corresponding to the first green CLC color film in the same sub-pixel; and wherein the second blue CLC color film is disposed corresponding to the first blue CLC color film in the same sub-pixel.

17. The method according to claim 16, wherein the first and second red, green and blue CLC color films constitute a pixel.

18. The method according to claim 16, wherein the first wavelength bands have a wavelength difference of less than about 50 nm from the second wavelength bands.

19. The method according to claim 18, wherein one of the first wavelength bands ranges from about 500 to 550 nm, and wherein one of the second wavelength bands ranges from about 550 to 600 nm.

20. The method according to claim 16, wherein each of wavelengths of red, green and blue colored light reflected by the first and second CLC layers has a wavelength band width of about 100 nm.

21. The method according to claim 16, wherein each of forming the first alignment layer and forming the second alignment layer includes coating an aqueous alignment material over the substrate in a thickness of about 500–2000 angstroms, curing the aqueous alignment material to be the alignment layer, and rubbing a surface of the alignment layer to have a desired alignment direction.

22. The method according to claim 21, wherein the first and second alignment layers are formed of a material selected from a group consisting of polyimide and polyamic acid.

23. The method according to claim 21, wherein rubbing the surface of the alignment layer forms a pretilt angle of less than about 10 degrees with cholesteric liquid crystal molecules of the first and second CLC layers.

24. The method according to claim 16, wherein each of forming the first CLC layer and forming the second CLC layer comprises:

mixing nematic liquid crystal and chiral dopants to form a mixture at a ratio ranging from about 1:1 to 10:1;

applying the mixture on one of the first and second alignment layer resulting in a reflected wavelength of the CLC layer in the range of about 200 to 400 nm;

irradiating a first UV light on the CLC layer with an exposure energy of about 100–700 mJ so as to form the red, green and blue CLC color films; and curing the red, green and blue CLC color films by irradiating the CLC color film with a second UV light with an energy of about 100–30000 mJ.

25. The method according to claim 24, wherein the mixture is dissolved in a solvent agent to be about a 35–55% solution and then the solution is strained through a less than about 0.2 mm filter to remove particles.

26. The method according to claim 25, wherein the solvent agent is selected from a group consisting of Toluene, Xylene and NMP(N-metyl-2-pyrrolidone).

27. The method according to claim 24, wherein the first UV light has a wavelength ranging from a bout 300 to 400 nm and the second UV light has a wavelength ranging from about 400 to 450 nm.

28. The method according to claim 24, wherein the first UV light has a wavelength of about 365 nm and the second UV light has a wavelength of about 405 nm.

29. The method according to claim 24, wherein forming the red, green and blue CLC color films depends on the exposure energy of the first UV light.

30. The method according to claim 24, wherein curing the red, green and blue CLC color films includes irradiating the CLC color films with the second UV light with an energy of about 600–18000 mJ.

31. The method according to claim 16, wherein surface-reforming the surface of the first CLC layer includes applying plasma on the surface.

32. The method according to claim 31, wherein the plasma is one of hydrogen plasma and oxygen plasma.

33. The method according to claim 31, wherein surface-reforming is conducted for about 60 seconds.

34. The method according to claim 16, wherein surface-reforming the surface of the first CLC layer includes applying an ion-beam on the surface.

35. The method according to claim 34, wherein applying the ion-beam on the surface includes forming plasma and filtering particles having the same energy level.

36. The method according to claim 16, wherein surface-reforming the surface of the first CLC layer forms a contact angle less than about 15 degrees between the first CLC layer and the second alignment layer.

37. The method according to claim 16, further comprising forming an light-absorbing layer between the substrate and the fist alignment layer.

* * * * *